United States Patent [19]
Wilson
[11] Patent Number: 5,040,763
[45] Date of Patent: Aug. 20, 1991

[54] GOLF CART UMBRELLA HOLDER

[76] Inventor: Donald R. Wilson, P.O. Box 130, West Newton, Pa. 15089

[21] Appl. No.: 393,128

[22] Filed: Aug. 14, 1989

[51] Int. Cl.[5] .................... B60R 11/00

[52] U.S. Cl. .................... 248/539; 224/275; 248/524

[58] Field of Search .......... 248/539, 524, 534, 205.4, 248/512; 180/13; 280/293, 304.5, DIG. 5, DIG. 6; 224/274, 275, 42.11, 42.42; 24/646; 296/78.1; 135/90, 95, 16

[56] References Cited

U.S. PATENT DOCUMENTS

| | | | |
|---|---|---|---|
| 96,745 | 11/1869 | Twamley | 248/524 X |
| 1,003,285 | 9/1911 | Miller | 248/539 |
| 2,782,971 | 2/1957 | Hershey | 224/274 |
| 2,932,544 | 4/1960 | Lambert | 224/275 X |
| 3,014,759 | 12/1961 | Bing | 224/275 X |
| 3,156,000 | 11/1964 | Westhoff | 224/274 X |
| 3,226,067 | 12/1965 | Klancnik | 248/539 |
| 3,226,068 | 12/1965 | Klancnik | 248/539 |
| 4,334,692 | 6/1982 | Lynch | 248/539 X |
| 4,807,927 | 2/1989 | Livick | 296/78.1 X |

FOREIGN PATENT DOCUMENTS

| | | | |
|---|---|---|---|
| 1352644 | 4/1963 | France | 224/42.11 |

*Primary Examiner*—David L. Talbott
*Assistant Examiner*—Daniel Hulseberg

[57] ABSTRACT

A golf cart umbrella holder comprising a unibody, saddle-shaped, flexible frame, a holding nest and interlocking sleeve which together firmly hold an umbrella staff and a series of straps which adjust to tighten the golf cart holder to most golf cart seats. The holder allows the golfer to easily insert an umbrella which provides protection to the golfer, his clubs, and personal property from sun, rain and other adverse weather conditions and at the same time is easily mounted or detached from the golf cart.

3 Claims, 2 Drawing Sheets

GOLF CART UMBRELLA HOLDER

BACKGROUND OF THE INVENTION

1. Field of the Invention

This invention relates generally to an umbrella holder for golf carts and other open vehicles which may be easily mounted over the seat or seats and strapped thereto for rigidity. The intended benefit is protection of the occupants and their personal property from rain, shine or other adverse weather conditions.

2. Description of the Prior Art

Golf has become one of the most popular and enjoyable sporting activities of professionals, amateurs and enthusiasts around the world. This spreading notoriety has caused an increased demand for better and safer equipment. Medical practitioners, physicians and health care specialists have now made the public aware of potential skin cancers that do result from overexposure to the sun's ultraviolet rays and in particular, to golfers who spend many hours in the open air. Since most golf carts are used on a rental basis from the golf course or country club, it is not always possible for the players to select a covered or canopied unit. Thus, there is a serious need for a device to accommodate the golfer's umbrella, which if held properly on the cart will provide the same protection.

One previous umbrella support assembly for golf carts is that designed by Lynch, U.S. Pat. No. 4,334,692, which is a detachable unit from and about the frame of a golf cart.

While there are a host of umbrella support assemblies, none are suited to the specific purposes outlined in this application. Thus, there is a need for a sturdy, easily mountable and detachable unit which will accommodate the golfer's umbrella for protection from the elements.

SUMMARY OF THE INVENTION

It is, therefore, an object of the present invention to provide an easily mounted and detached golf umbrella holder that may be placed over a single or multiple golf cart seat.

It is further the object of this invention to provide a safe and durable golf cart holder that is not hazardous to the public health and/or environment.

It is the further object of the invention to provide a golf umbrella holder which holds the rod firmly to eliminate vibration and loosening during wind, rain and other adverse conditions.

It is the further object of the invention to provide a golf umbrella holder that serves to protect the seats, occupants, golf cart, expensive clubs and equipment which are generally strapped to the rear of the golf cart.

It is the further object of the invention with the various sizes of golf umbrellas presently in existence to provide a golf umbrella holder that offers flexibility to hold umbrella rods of various diameters.

It is the further object of the invention to provide a golf umbrella holder that is constructed from materials which are not subject to rust and corrosion.

It is the further object of the invention to provide a golf umbrella holder that is designed to fit most, if not all, existing golf carts.

It is the further object of the invention to provide a golf umbrella holder that allows golf clubs and bags to be removed or replaced when the umbrella is in the open position.

It is the further object of the invention to provide a golf cart umbrella holder that is of suitable size, weight and compactness such that it may be removed and carried anywhere with very little effort.

It is the further object of the invention to provide a golf cart umbrella holder that may be mounted on a single-seat or two-seat golf cart.

It is the further object of the invention to provide a golf cart umbrella holder that does not require alteration or modification to any of the various golf carts whereon it will be installed.

It is the further object of the invention to provide a golf cart umbrella holder that may be adapted for permanent mounting in a fixed position if the golf cart owner should so desire.

It is the further object of the invention to provide a golf cart umbrella holder with a tray section to keep personal items like golf balls, cigarettes, score cards and other items dry and shaded from the direct rays of the sun.

More specifically, the present invention is a golf cart umbrella holder for protection of occupants and equipment therein from sun, rain, and other adverse weather conditions, comprising a one-piece, unibody, saddle-shaped, flexible frame having a thickness for strength, a horizontal plate section suitable for fitting over a golf cart seat; a securing means for holding a golf cart umbrella in a firm, vertical position; a tightening means for firmly attaching said frame to said golf cart seat.

These objects, as well as other objects and advantages of the present invention, will become apparent from the following description, in reference to the illustrations appended hereto.

BRIEF DESCRIPTION OF THE DRAWINGS

For a better understanding of the invention, reference may be had to the accompanying drawings, in which.

DESCRIPTION OF PREFERRED EMBODIMENTS

Figure 1:
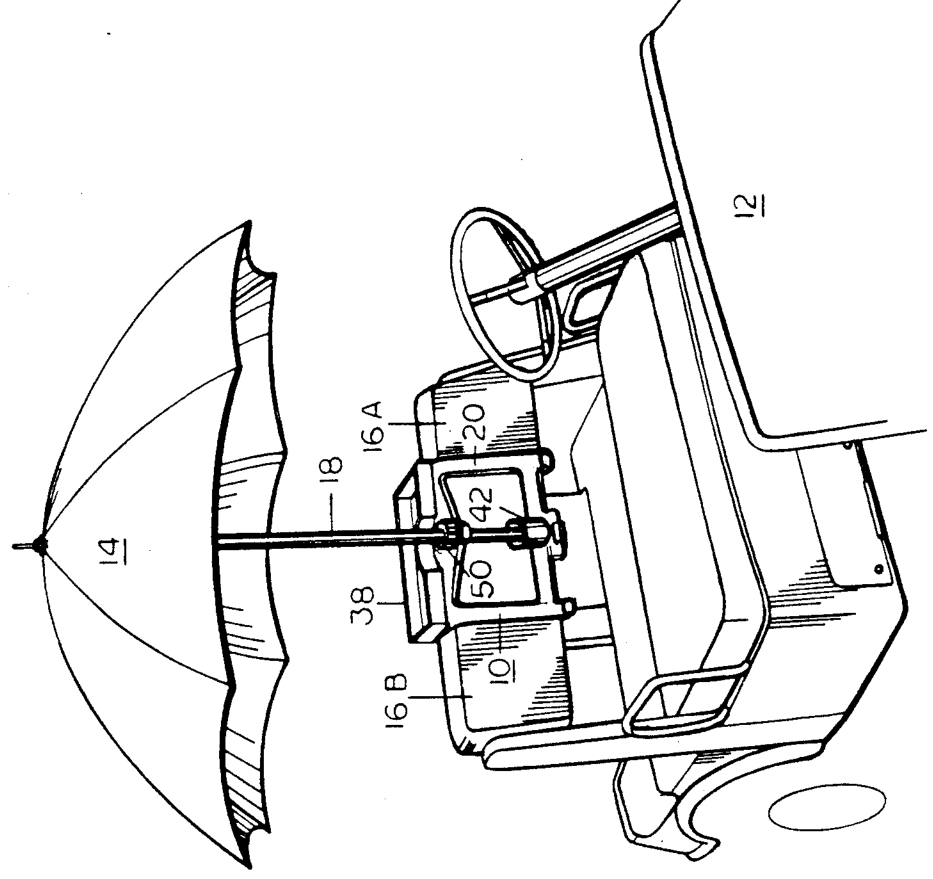
FIG. 1 is a perspective view of a conventional golf cart with the inventor's golf cart umbrella holder uniquely mounted on a golf cart seat.

Referring to the drawings, FIG. 1 is a perspective view of a golf cart umbrella holder 10, mounted over right golf cart seat **16*a* and left golf cart seat 16*b* of golf cart 12 and umbrella 14 having an umbrella staff 18 which is supported vertically over golf cart 12 by golf cart umbrella holder 10 through a locking means 50 and holding nest 42. Golf cart umbrella holder 10 is structured from a one-piece, unibody, saddle-shaped, flexible frame 20 which is preferably made from polypropylene molded plastic which provides the necessary rigidity and flexibility. An added feature of golf cart umbrella holder 10 is tray section 38** which may be used for holding and protecting personal items like score cards, golf balls, tees, cigarettes and other miscellaneous items.

Figure 3:
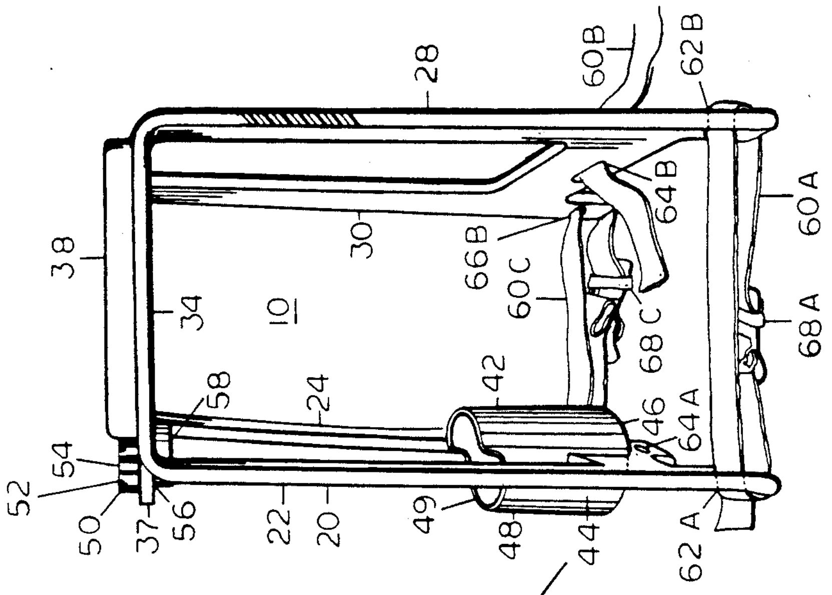
FIG. 3 represents a side elevation view of the inventor's golf cart umbrella holder.
Figure 2:
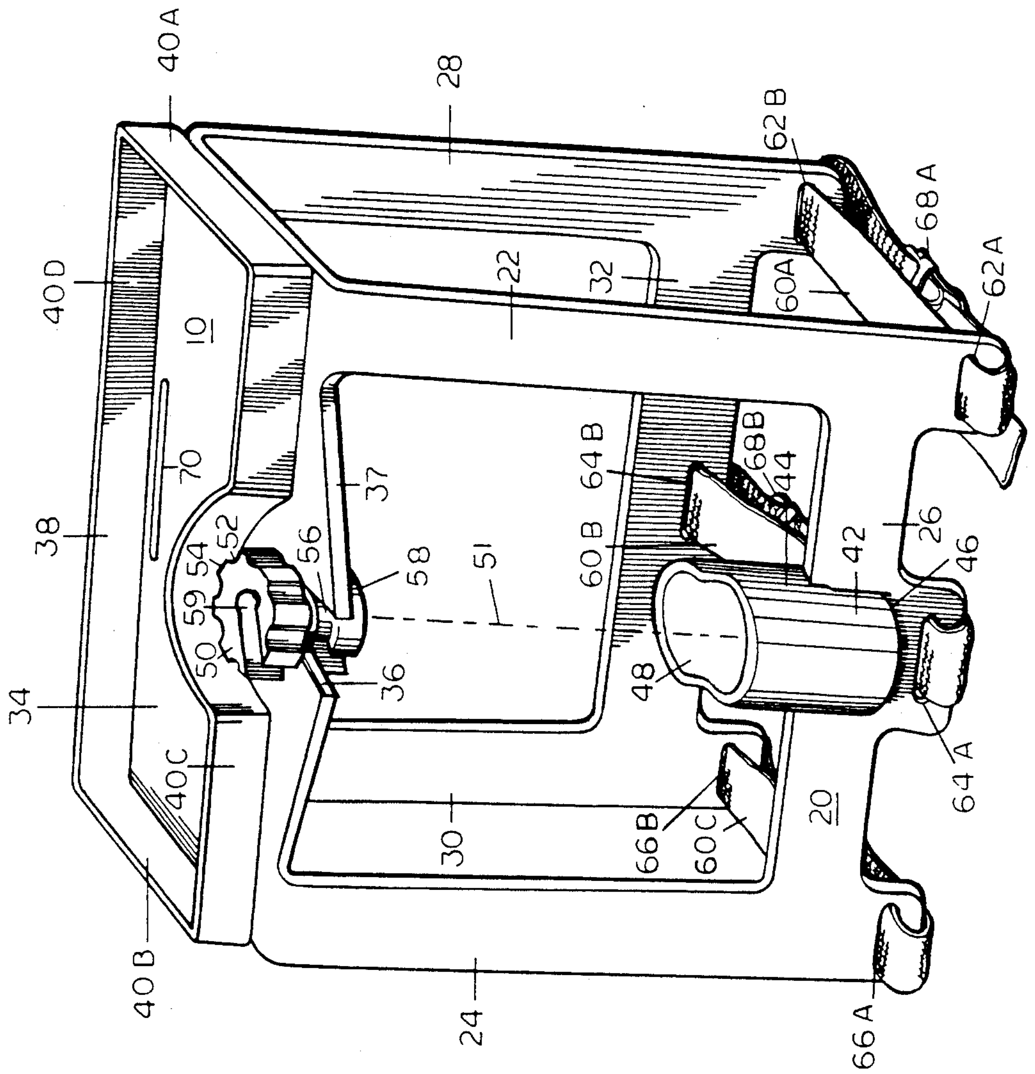
FIG. 2 is a detailed perspective view of the inventor's golf cart umbrella holder.

FIG. 2 shows a golf cart umbrella holder 10 in perspective view and FIG. 3 illustrates golf cart umbrella holder 10 from a side elevation, where frame 20 consists of right vertical front support member 22, left vertical front support member 24, right vertical rear support member 28 and left vertical rear support member 30. Lower horizontal front support member 26 connects right vertical front support member 22 to left vertical front support member 24 and supports holding nest 42. Likewise, lower horizontal rear support member 32 connects right vertical rear support member 28 and left vertical rear support member 30.

Frame 20 further consists of upper horizontal plate member 34 which is connected to and integral with the aforesaid vertical support members 22, 24, 28, 30, and horizontal support members 26 and 32; together said members form a flexible yet rigid saddle-shaped configuration of golf cart umbrella holder 10. Horizontal plate member 34 has protrusion 37 having slotted aperture 36 for holding locking means 50 as viewed in FIGS. 2 and 3 thus centering locking means 50 over holding nest 42 on an imaginary vertical axis 51 for holding umbrella staff 18.

Tray section 38 as shown in FIGS. 2 and 3 for holding personal items like golf balls, cigarettes and other property has right side wall 40*a*, left side wall 40*b*, front side wall 40*c*, and rear side wall 40*d* which prevent said personal items from sliding or rolling when the cart is in motion or parked on a sloping surface. Further, slot 70 consists of an indentation in upper horizontal plate 34 for the purpose of holding a golf score card or other paper.

Holding nest 42 as shown in FIGS. 2 and 3 consists of cylindrical side section 44 which preferably has its front top quarter section 49 cut out for easy removal of umbrella staff 18. Holding nest 42 has open top, circular section 48 and closed bottom circular section 46 for encasing a tip of umbrella staff 18 which may be easily placed in or removed from said holding nest 42.

Locking means 50 as shown in FIGS. 2 and 3 fits firmly into protrusion 37 by sliding and snapping the grooved track section 56 into aperture 36. Locking means 50 is prevented from moving vertically because upper sleeve section 52 and lower sleeve section 58 are of greater diameter than central groove track 56. Locking means 50 is preferably cylindrical in shape and preferably constructed from polypropylene molded plastic like frame 20, although other materials including, but not limited to other plastics, aluminum, stainless steel and fiberglass may also be used. Locking means 50 may be rotated by hand up to 360 degrees by gripping multiple notches 54 which are cut into upper sleeve section 52. Locking means cavity 59 is cut into locking means 50 in skeleton key shape and allows umbrella staff 18 to be inserted or removed. Locking means 50 prevents umbrella staff 18 from moving when locking means 50 is turned by hand to the left or right and is most effective in the 90 degree to 270 degree range of positions.

Straps labeled right strap 60*a*, central strap 60*b*, and left strap 60*c* are used to fasten golf cart umbrella holder 10 around the bottom of right golf cart seat 16*a* and left golf cart seat 16*b*. Straps 60*a*, 60*b*, and 60*c* are preferably made from nylon which is strong and durable although other materials may be used including various synthetics, canvas, rubber, stainless steel or aluminum. Right strap 60*a* is looped through right front strap slot 62*a* and right rear strap slot 62*b* with tension being adjusted by use of right strap buckle 68*a*. Likewise, central strap 60*b* is looped through central front strap slot 64*a* and central rear strap slot 64*b* with tension being adjusted by use of central strap buckle 68*b*. Likewise, left strap 60*c* is looped through left front strap slot 66*a* and left rear strap slot 66*b* with tension being adjusted by use of left strap buckle 68*c*.

Golf cart umbrella holder 10 is placed over right seat 16*a* and left seat 16*b*. Right strap 60*a*, central strap 60*b* and left strap 60*c* are then looped as previously described and adjusted to tighten right vertical front support member 22, left vertical front support member 24, lower horizontal front support member 26, right vertical rear support member 28, left vertical support member 30 and lower horizontal rear support member 32 securely against right seat 16*a* and left seat 16*b*. Golf cart umbrella holder 10 is securely tightened until right seat 16*a* and left seat 16*b* are compressed approximately one-half to one inch. Umbrella staff 18 is then inserted to golf cart umbrella holder 10 as previously described.

In accordance with the provisions of the Patent Statutes, I have explained the principle and operation of my invention and have illustrated and described what I consider to represent the best embodiment thereof.

I claim:

1. A golf cart umbrella holder for protection of occupants and equipment therein from sun, rain and other adverse weather conditions, comprising:

a one-piece unibody, saddle-shaped, flexible frame having a thickness for strength, a horizontal plate section suitable for fitting over a golf cart seat;

a securing means consisting of a holding nest for receiving a lower end of an umbrella staff integral to said frame on a vertical axis and a locking means positioned on said vertical axis for fastening said umbrella staff firmly to eliminate movement and vibration;

wherein said holding nest encircles said lower end of said umbrella staff and restrains downward movement;

wherein said locking means is a rotary-inter-locking means having an umbrella holding cavity where said umbrella staff may rest;

wherein said rotary inter-locking means consists of an upper sleeve section which may be gripped to rotate said rotary inter-locking means about said vertical axis around said umbrella staff to secure and release said umbrella staff, a central grooved track section of less diameter than said upper sleeve section for fitting into a slotted aperture located in said horizontal plate section and a lower sleeve section of greater diameter than said central grooved track section so as to prevent said locking means from moving up or down on said vertical axis;

a tightening means for firmly attaching said frame to said golf cart seat.

2. A golf cart umbrella holder for protection of occupants and equipment therein from sun, rain and other adverse weather conditions, comprising:

a one-piece, unibody, saddle-shaped, flexible frame having a thickness for strength, consisting of a multitude of vertical and horizontal support members connecting to a horizontal plate section;

a securing means for holding a golf umbrella in a firm, vertical position where said securing means consists of a holding nest for receiving a lower end of an umbrella staff integral to said frame on a vertical axis and a locking means positioned on said vertical axis for fastening said umbrella staff firmly to eliminate movement and vibration;

wherein said horizontal plate section of said frame forms a bottom to a tray means for holding and protecting personal items like score cards, balls, tees, cigarettes, and other miscellaneous items;

wherein said holding nest encircles said lower end of said umbrella staff and restrains downward movement;

wherein said locking means is a rotary inter-locking means consisting of an upper sleeve section which may be gripped to rotate said rotary inter-locking means about said vertical axis around said umbrella staff to secure and release said umbrella staff, a central grooved track section of less diameter than said upper sleeve section for fitting into a slotted aperture located in said horizontal plate section and a lower sleeve section of greater diameter than said central grooved track section so as to prevent said locking means from moving up or down on said vertical axis;

a tightening means for firmly attaching said frame to a golf cart seat.

3. A golf cart umbrella holder according to claim 2, wherein said tightening means comprises a strap means for tightening said frame against said golf cart seat.

* * * * *